Figure 1:
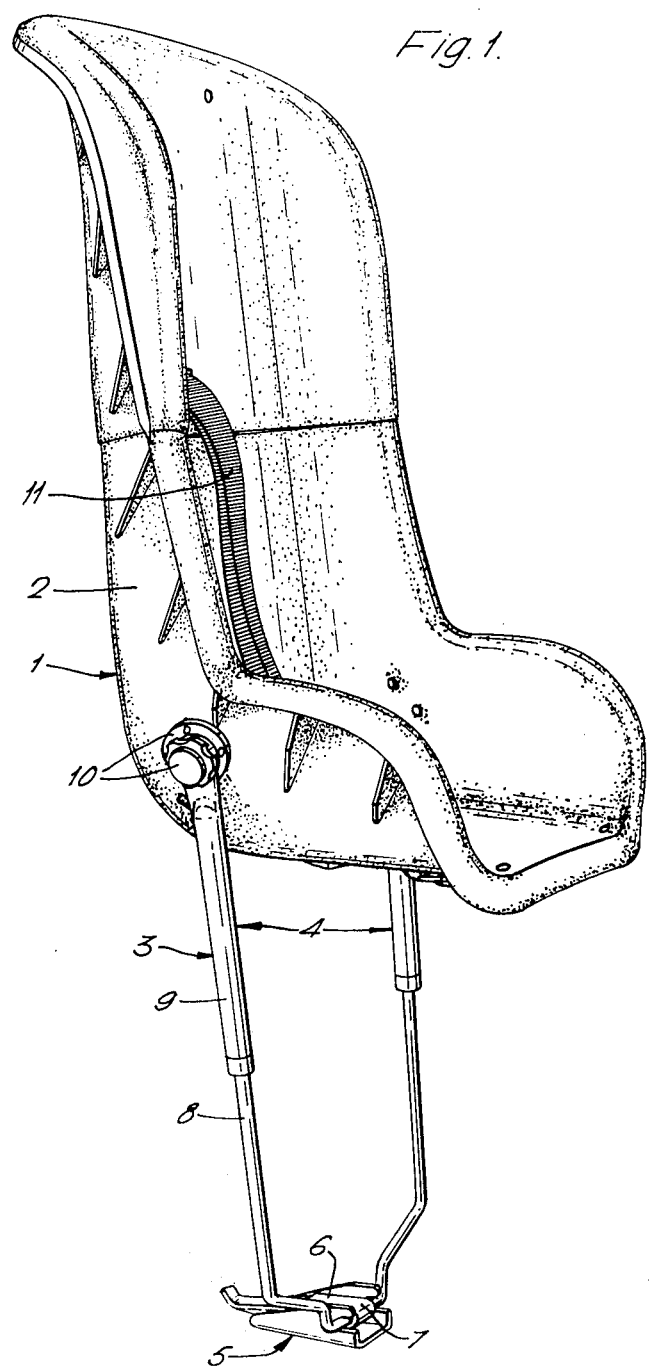

United States Patent [19]

Johansson

[11] 4,183,580
[45] Jan. 15, 1980

[54] ARRANGEMENT FOR VEHICLE SEATS FOR CHILDREN

[76] Inventor: Karl-Eric Johansson, Tranås, Sweden

[21] Appl. No.: 851,879

[22] Filed: Nov. 16, 1977

[30] Foreign Application Priority Data

Nov. 17, 1976 [SE] Sweden ................. 7612816

[51] Int. Cl.² ............................ A47C 1/08; A47C 9/06
[52] U.S. Cl. .................. 297/250; 248/503.1; 297/15; 297/345
[58] Field of Search ............... 248/503.1, 510, 119 R, 248/505; 297/250, 15, 243, 345; 296/37.14, 37.15; 24/263 R, 68 T, 68 A, 68 SB, 68 R, 248 B, 132 WL

[56] References Cited

U.S. PATENT DOCUMENTS

| 816,899 | 3/1906 | Chase | 297/15 |
|---|---|---|---|
| 1,231,156 | 6/1917 | Heaslet | 297/15 |
| 3,366,996 | 2/1968 | Springer | 24/68 SB |
| 3,515,431 | 6/1970 | Grady | 297/250 |
| 3,703,312 | 11/1972 | Chapman | 297/15 X |
| 3,915,493 | 10/1975 | Brown | 296/63 |
| 3,955,847 | 5/1976 | Schiowicz | 248/119 R |
| 4,049,301 | 9/1977 | Shewenk | 24/68 R |
| 4,067,608 | 1/1978 | Von Wimmersberg | 297/390 |
| 4,082,350 | 4/1978 | Tomforde | 297/250 X |

Primary Examiner—James T. McCall
Attorney, Agent, or Firm—Howson and Howson

[57] ABSTRACT

A children's seating arrangement for use in vehicles comprises a seat portion pivotably mounted between the upper free ends of a U-shaped bow of rigid material, the lower horizontal end of the bow being releasably mounted in a locking-type floor-mounted fixture and the length of the side arms of the bow being longitudinally adjustable by means of a threaded arrangement on each such arm. The height of the seat can therefore be suitably adjusted, as can the angular position of the seat, and the entire assembly easily removed and replaced by operating the detachable locking means.

6 Claims, 5 Drawing Figures

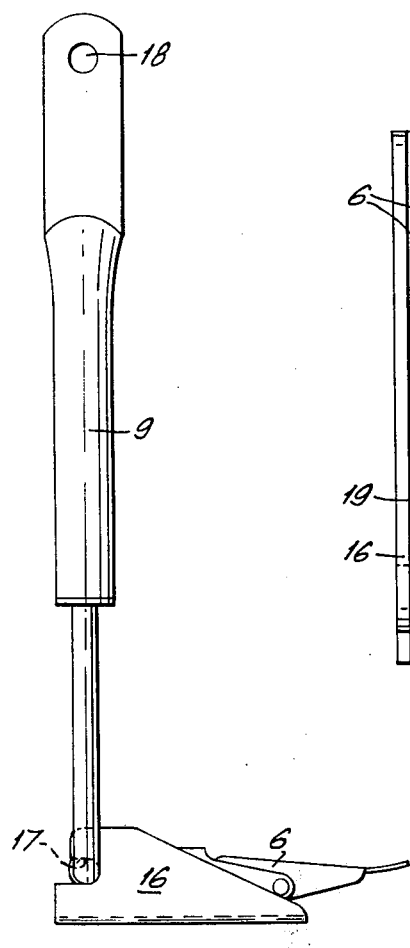
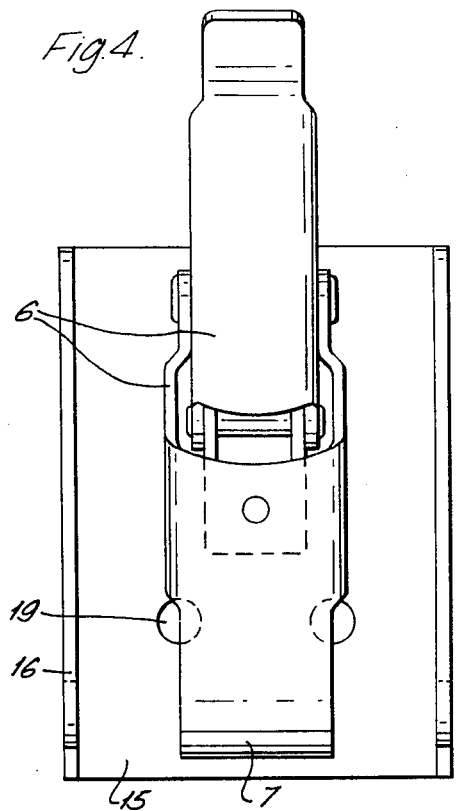
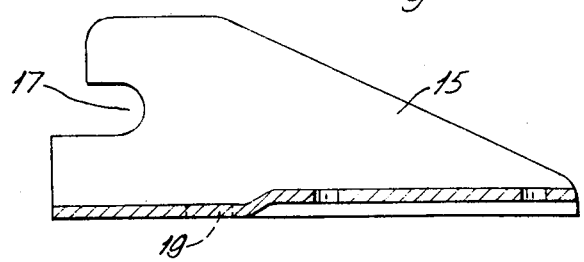

ARRANGEMENT FOR VEHICLE SEATS FOR CHILDREN

This invention relates to an arrangement for such a kind of seats which are intended for use by children when riding in boats or motor vehicles such as an automobile and preferably in a private car and the like. The arrangement comprises a seat portion and holder means for holding or supporting the seat portion.

There is a need of holding so called children's car seats in a safe way. The seat portion itself of these seats for children has during the last few years being developed to a safe and satisfactory construction, while the arrangements to hold the seat in place has been solved by holder-bands of textile material. Said bands hold the seat portion in place and are connected to the seat and the floor or the car by fittings, whereby the bands lead between these fixedly attached fittings. Mounting and dismounting is performed by manipulating the bands.

By using such bands for holding the seat in place, the seat does not obtain any rigidity laterally and it happens when the vehicle for example receives a bump in the side for example when a side-collision appears, that the seat is displaced laterally whereby the safety is jeopardized. Further, the known arrangements with bands for mounting and holding of the seat part have shown that they are difficult to adjust and set. It is difficult to obtain a satisfactory position for the seat in the vehicle. The possibility to adjust the bands is also difficult to carry out. Besides the mounting and dismounting of the known arrangements is difficult, which is especially disadvantageous when the seat is only used occasionally but frequently as an auxiliary seat for a child.

Said disadvantages are set aside when using an arrangement according to this invention. Thus, one obtains a laterally rigid construction for holding the seat portion, which by the construction is arranged more stable laterally. The arrangement results even in a more stable construction if compared with the known arrangement after a long time of use. An important object of the present invention is to provide a seat of the type set forth which is safe for the child using the seat even in case of a sudden stop or accident. By the fact that the construction lies close to or bears on the front side of the vehicle's regular seat the seat for children is hold better in place in the lengthwise direction of the vehicle. The construction, which is made of a weather-proof material, shows also such a shaping, that it fits all kind of vehicle's floors, and it is an object of the invention to provide an improved anchor element or plate, which also can be formed to fit the contour of the floor. Another object is to provide a car seat for children which can be inserted and mounted in a simple manner and a repeatedly mounting and dismounting of the seat is easy performable and such a mounting and dismounting does not result in that the adjustment of the arrangement is changed or altered but when mounting the seat after a dismounting, the seat can be conveyed to its position and fastened by a hook, and is then ready for use. However, the arrangement is adjustable for the height for different vehicle's seats and is for the rest adjustable vertically in a simple manner. Still another important object is to provide such a seat with holder means which is equipped with a safety belt. Further, the seat is not only safer but also comfortable. The device which holds the seat portion is arranged pivoted to the seat portion, whereby the seat portion can be arranged so that it will take up the weight at an angle of 90 degrees, when the vehicle is involved in a sudden stop as for example a collision or a crash, which in turn means that the child receive a minimum weight on its shoulders. When known seats for children of this kind have been used in vehicles, which have been involved in a crash, the seat has taken a disadvantageous leaning position, and often has the seat tilt to an angle, which differs from the intended up to 20 degrees, which has the result that the child is hurt. The risk for stretching or extension of the material is avoided by the choice of material for the holding arrangement. When using textile bands for holding the seat parts, the bands can be extended when the arrangement is used and especially when the arrangement is loaded or overloaded, whereby the arrangement is consumed.

The arrangement according to the invention is characterized in that the holder means are composed of an anchor element and a bow of rigid material, whereby said anchor element is intended for a stiff arrangement with the vehicle, preferably the floor of the vehicle, while said bow is intended for being arranged to said seat portion and is further arranged capable for anchoring on said anchor element.

Figure 2:
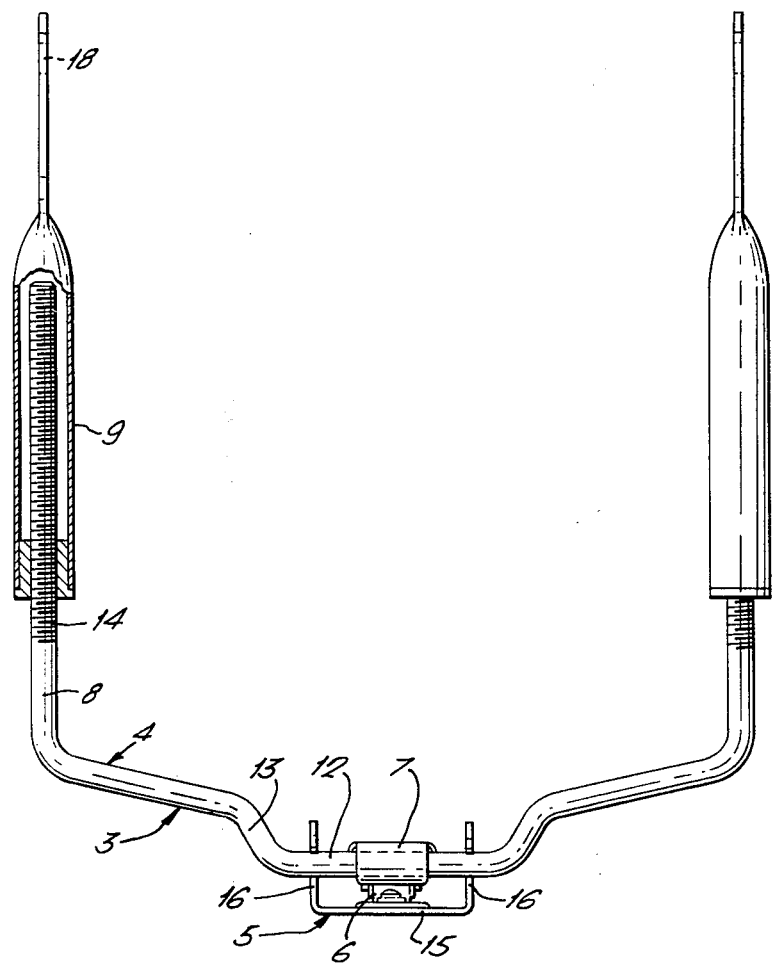

Further characteristics and advantageous features for the arrangement according to the invention will be evident from examples in the following description of the invention, whereby a contemporary reference will be made to the enclosed schematic drawings, wherein FIG. 1 shows in perspective a seat with holder means according to one embodiment of the arrangement according to the invention, FIG. 2 shows in an enlarged view a plan of the holder means, FIG. 3 shows a plan of the holder means according to FIG. 2 but from another side, FIG. 4 shows in a more enlarged view a plan of an anchoring element which is included in the holder means and FIG. 5 shows in a side elevation a portion of an anchoring element.

FIG. 1, reference indication 1, indicates an arrangement in vehicle's seats for children and comprises an auxiliary seat portion 2 and holder means 3 for supporting the seat portion. The seat portion can have any suitable and known shape for a comfortable and a safe transportation of a child, which among other things means that the back of the seat portion reaches above the head of the child and that the seat often shows side borders as a support laterally for the child, but the seat is of such a kind which preferably rests with its underside on a regular seat and with its back against the facia panel.

The holder means 3 are composed of a bow 4 and an anchor element 5 showing a locking device 6 with a catch 7 or clasp formed as a hook. The bow is U-shaped and includes a U-shaped rod element 8 showing threaded parts at the free ends for connection with sleeve-shaped devices or casings 9 as adjusting elements. The free ends of the adjusting elements are arranged to be in engagement with fittings 10, which are arranged on opposite side walls of the seat portion and shaped in such a way that the adjusting elements easily can be put in engagement with the fittings. The fittings can for example consist of a screwed tap and a knob or a screw nut, whereby the seat portion can be secured to the holder means. The seat portion shows also a safety belt 11. The seat portion 2 is made of preferably plastic material with a cover of textile fabrics and the bow 4 and also the anchor element 5 with the locking device 6 consists of a rigid material as metal. The anchor element 5 is intended for a stiff arrangement with the boat or motor vehicles, preferably the floor of the vehicle and provides for example through holes 19 or the like, see FIG. 4, for a fixed engagement with the floor. Further, the anchor element shows grooves 17, see also FIG. 5, for engagement with the bow 4 when the seat is inserted. The seat or its bow is then locked in said engaged position with the anchor element by a locking device 6 having a catch 7, which is arranged for clamping the bow in the locking postion.

The bow 4 shows a portion for engagement with the anchor element, whereby said portion shows on one hand a straight portion 12, which shows a length which is equal with or preferably somewhat longer than the distance between the portions 16 shaped in the anchor element to engage with the bow and on the other hand portions 13 which are directed upwards and situated outside said engagement portions 16 of the anchor element. By this shaping, the bow 4 cannot slide in the anchor element 5 as said upwards directed portions 13 have a function as stops. Said threaded portions of the free ands of the rod 8 can be seen in FIG. 2, see reference indication 14.

The casings 9 receive said free ends of the rod and by screwing home or slackening the casings one can adjust the length of the holder means 3 or the bow 4. Further, the casings show for example through holes 18 for engagement with the fittings 10 of the seat portion. The bow is intended for being arranged to the seat portion and when the bow shows an adjusted or proper length so the bow reaches to the anchor element, the bow is caught and clamped and then locked by means of the locking device by connecting the catch around the bow or rod element and bringing the locking device to a locking position.

When one to remove the seat from the vehicle, one only to unlock the locking device and remove the rod element from its engagement with the anchor element.

Without exceeding the scope of the concept of the invention, modifications may be made to the arrangement shown and described. Therefore, the invention is not limited to the embodiment shown and described, but only by the following patent claims.

I claim:

1. In a children's seating arrangement for use in vehicles, comprising a seat portion and holder means for holding said seat portion, the improvement wherein said holder means comprises a generally U-shaped bow of rigid material and an anchor element, said anchor element comprising means for securing it to the floor of a vehicle and a releasable locking device adapted to receive the closed lower end of said U-shaped bow releasably in a locked position in said anchor element, said holder means further comprising means for mounting said seat portion to and between the upper free ends of the spaced-apart arms of said U-shaped bow.

2. The arrangement of claim 1, wherein each of said arms comprises a length-adjustment portion for permitting adjustment of the lengths of said arms.

3. The arrangement of claim 2, wherein each of said length-adjustment portions comprises a cylinder and a rod, co-axially disposed and threaded one into the other whereby said adjustment of length can be accomplished by relative rotation of each said cylinder with respect to its associated rod.

4. The arrangement of claim 1, wherein said seat mounting means comprises mutually cooperating adjustable pivot means for permitting adjustable angular positioning of said seat portion with respect to said holder means.

5. The arrangement of claim 1, wherein said locking device comprises a catch and a hook which is adapted to grasp said closed lower end of said U-shaped member.

6. The arrangement of claim 5, wherein said closed lower end has a central straight horizontal portion and said locking device comprises recesses having dimensions fitting said horizontal portion when said horizontal portion is placed therein.

* * * * *